Figures 1, 2:
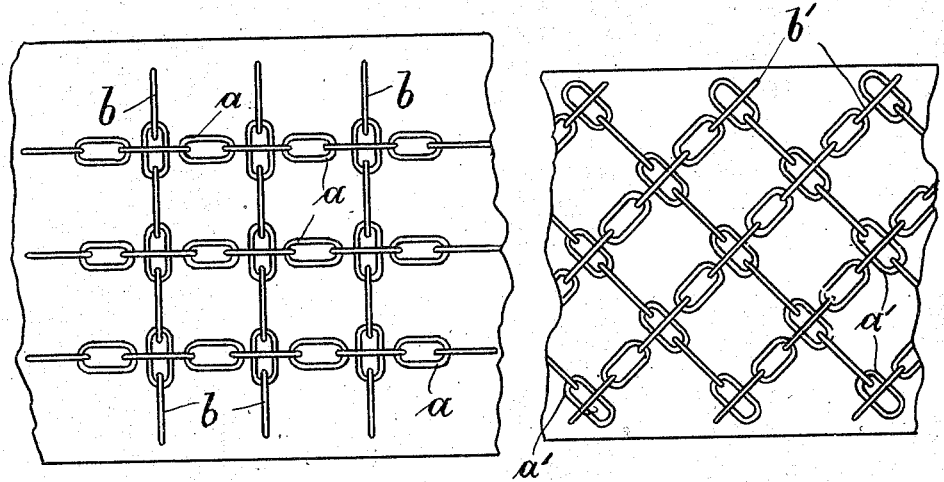

H. R. KRASTEL.
PNEUMATIC TIRE.
APPLICATION FILED AUG. 4, 1909.

981,091.

Patented Jan. 10, 1911.

Witnesses:
Joseph C. Cavanaugh
Frances Brady.

Inventor
Hans Reimar Krastel
By Max D. Ordmann
atty.

UNITED STATES PATENT OFFICE.

HANS REIMAR KRASTEL, OF DARMSTADT, GERMANY.

PNEUMATIC TIRE.

981,091.

Specification of Letters Patent. Patented Jan. 10, 1911.

Application filed August 4, 1909. Serial No. 511,140.

*To all whom it may concern:*

Be it known that I, HANS REIMAR KRASTEL, subject of the Grand Duke of Hesse, residing in Darmstadt, Grand Duchy of Hesse, in the Empire of Germany, engineer, have invented certain new and useful Improvements in Pneumatic Tires, for which application has been made in Germany, dated August 4, 1908; Great Britain, dated August 21, 1908; Austria-Hungary, dated August 19, 1908; Switzerland, dated August 18, 1908; France, dated August 21, 1908, and Belgium, dated August 27, 1908.

The ordinary pneumatic tires for wheels have hitherto been made entirely of material giving the actual adhesion and also receiving the pressure, consisting of a canvas cover which is stuck together in various layers by the vulcanization of rubber. Now it has been found that under the very great strains, caused on the one hand by the load to be carried and on the other hand by the action of the operating motor, that it is not possible to make a tire of canvas layers which permanently affords absolute safety. The difficulty more particularly consists in maintaining the separate canvas layers permanently in their relative position. Efforts have also been made to make the pneumatic tire by not employing a fabric, but of cords twisted together and impregnated with rubber. This method of manufacture is however very difficult and also the drawbacks, which the use of vegetable fibers in itself involves, are not removed.

Now this invention has for its object to make the part of the pneumatic tire directly sustaining the pressure of metal.

The employment in pneumatic tires of insertions of metallic fabric or the like, either directly embedded in the cover or as a protective layer between the cover and the air tube is well known. In all this construction however the elasticity of the metal is affected, and it has been found that no metal is adapted to endure the extremely numerous flexions without rapid alteration of structure, and moreover it very rapidly breaks. Protective inlays have also been constructed which were composed of interengaging metal parts, rings, plates and the like. These cannot however come into consideration at all for the present object, because the separate members do not possess sufficient relative freedom of motion. In particular they do not allow any diagonal movement, and therefore their use as a covering insertion is excluded.

The present invention consists of a pneumatic tire in which the part of the pneumatic tire directly sustaining the pressure consists of chain links which are so engaged with one another that a mobility is obtained exactly as full and complete as with a canvas fabric.

Figure 3:
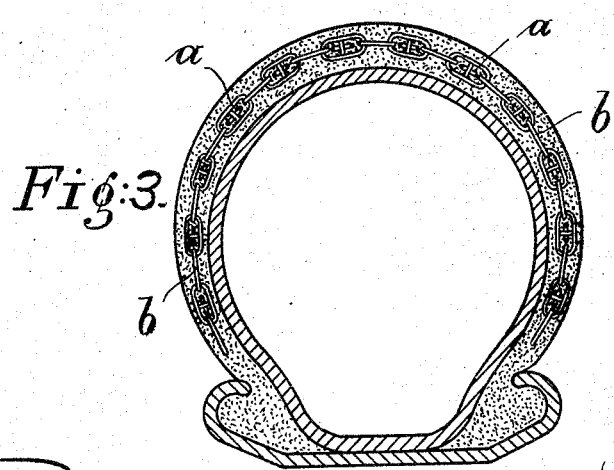

The invention will be now described with reference to the accompanying drawings, in which: In the form of construction shown in Figure 1, longitudinal chains $a$ and cross chains $b$ are provided. The latter run through the former chains which is easily obtainable with a correct arrangement of the respective links of the chains. In the almost similar form of construction shown in Fig. 2, short chains $a'$, $b'$ run transversely over one another from one side to the other. Fig. 3 is a section of the tire as a whole.

The method of the embedding is also immaterial as regards the invention. India-rubber, as well as leather, prepared felt and the like may equally be employed, and the method of embedding may also be effected in various ways.

Having now particularly described the nature of my said invention and in what manner the same is to be constructed, I declare that what I claim is:

In a pneumatic tire, an embedded chain work, comprising crosswise extending strands, which run through one another and are freely movable within one another.

In testimony whereof I affix my signature in presence of two witnesses.

HANS REIMAR KRASTEL.

Witnesses:
 JEAN GRUND,
 CARL GRUND.